(12) United States Patent
Yun

(10) Patent No.: US 12,017,511 B2
(45) Date of Patent: Jun. 25, 2024

(54) AIR CONDITIONER SYSTEM FOR MOBILITY

(71) Applicants: Hyundai Motor Company, Seoul (KR); Kia Corporation, Seoul (KR)

(72) Inventor: Nam Seok Yun, Hwaseong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 22 days.

(21) Appl. No.: 17/863,159

(22) Filed: Jul. 12, 2022

(65) Prior Publication Data

US 2023/0173889 A1 Jun. 8, 2023

(30) Foreign Application Priority Data

Dec. 2, 2021 (KR) .................. 10-2021-0170967

(51) Int. Cl.
*B60H 1/32* (2006.01)
*B60H 1/00* (2006.01)
*B60L 1/00* (2006.01)
*B60L 1/04* (2006.01)

(52) U.S. Cl.
CPC ....... *B60H 1/3227* (2013.01); *B60H 1/00278* (2013.01); *B60H 1/00821* (2013.01); *B60L 1/04* (2013.01); *B60L 2240/36* (2013.01)

(58) Field of Classification Search
CPC .............. B60H 1/3227; B60H 1/00278; B60H 1/00821; B60L 1/04; B60L 58/15; B60L 2240/36
See application file for complete search history.

(56) References Cited

U.S. PATENT DOCUMENTS

| 9,020,674 | B2 | 4/2015 | Gregg et al. | |
| 2019/0193522 | A1* | 6/2019 | Takeuchi | B60L 7/14 |
| 2019/0193523 | A1* | 6/2019 | Takeuchi | B60L 15/2009 |
| 2019/0202261 | A1* | 7/2019 | Takeuchi | B60W 10/30 |
| 2022/0325930 | A1* | 10/2022 | Day | B60H 1/00907 |

FOREIGN PATENT DOCUMENTS

| JP | 6351301 | 6/2018 |
| KR | 10-2008-0092527 | 10/2008 |

* cited by examiner

Primary Examiner — Marc E Norman
(74) Attorney, Agent, or Firm — MORGAN, LEWIS & BOCKIUS LLP

(57) ABSTRACT

An air conditioner system for mobility is provided. The air conditioner system is configured to secure the air conditioning performance in cooling and heating conditioning and to prevent a battery from being deteriorated as the battery is prevented from being overcharged while the air conditioner system is driven when the battery is charged by the regenerative breaking while the charge amount of the battery is already high.

19 Claims, 5 Drawing Sheets

AIR CONDITIONER SYSTEM FOR MOBILITY

CROSS REFERENCE TO RELATED APPLICATION

The present application claims priority to Korean Patent Application No. 10-2021-0170967, filed Dec. 2, 2021, the entire contents of which is incorporated herein for all purposes by this reference.

BACKGROUND OF THE PRESENT DISCLOSURE

Field of the Present Disclosure

The present disclosure relates to an air conditioner system for a mobility, wherein the air conditioner system is configured to secure air conditioning performance in air cooling and heating, and to prevent a battery from being deteriorated according to overcharging of the battery.

Description of Related Art

Recently, an electric mobility has been on the rise as a social issue such as the implementation of environmentally friendly technology and energy depletion. The electric mobility is operated using a motor that receives electricity from a battery and outputs power. Therefore, the electric mobility is receiving attention as eco-friendly vehicles because such electric mobility does not emit carbon dioxide, makes low noise, and has a motor with higher energy efficiency than an engine.

A key technology for implementing such the electric mobility is a technology related to a battery module, and recent studies are being actively carried on light weight, miniaturization, and short charging time of batteries. The battery module should be used in optimal temperature environment to maintain optimal performance and long lifespan.

Furthermore, because the electric mobility has no waste heat source generated during combustion in a separate engine like an internal combustion engine, indoor heating of the electric mobility is performed using an electric heating device in winter, and because warm-up is required to improve battery charging and discharging performance in cold weather, a separate coolant heating type electric heater is used.

Meanwhile, regenerative breaking is provided in the electric mobility to improve energy efficiency of the mobility. In other words, the regenerative breaking is to generate electrical energy by use of a braking force when the deceleration of mobility occur, and the regenerative breaking is essentially applied to the electric mobility to secure electrical energy, which is important for an electric mobility.

However, when the regenerative breaking occurs while the battery charge amount is already high, there is a problem that deterioration of the battery occurs by overcharging of the battery. However, when the battery charge amount is high, the regenerative breaking is not operated, but when the regenerative breaking is turned to a friction type brake, a sense of heterogeneity occurs in braking, which is directly related to safety of a driver, and a safety problem occurs, and the heterogeneity causes inconvenience to the driver.

The foregoing referred to as the controller and the controlling method of operating a fuel cell is intended merely to aid in the understanding of the background of the present disclosure, and is not intended to mean that the present disclosure falls within the purview of the related art which is already known to those skilled in the art.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an air conditioner system for a mobility, wherein the air conditioner system is configured to secure air conditioning performance in air cooling and heating, and to prevent a battery from being deteriorated according to overcharging of the battery.

In various aspects of the present disclosure, there is provided an air conditioner system for a mobility, the air conditioner system including: an electrically driven compressor configured to circulate a refrigerant; an external heat exchanger including a first heat exchanger and a second heat exchanger and configured to perform heat exchange with outdoor air to adjust temperature of the refrigerant; an inflator configured to inflate the refrigerant; an indoor heat exchanger configured to adjust temperature of air supplied indoors through heat exchange; and a valve unit configured to selectively switch a circulated direction of the refrigerant to selectively circulate the refrigerant into the external heat exchanger and the indoor heat exchanger depending on whether air cooling and heating is performed or not and overcharging of electric power occurs or not.

The external heat exchanger may be provided at the outdoor space and configured to perform heat exchange with the outdoor air and to discharge the heat-exchanged air outdoors, and the indoor heat exchanger may be provided at the indoor space and configured to adjust the temperature of the heat-exchanged air and supply the heat-exchanged air to the indoor as conditioned air.

The valve unit may include a switching valve and a plurality of valves, the switching valve being configured to switch circulation of the refrigerant compressed in the electrically driven compressor into the indoor heat exchanger or the external heat exchanger, and the plurality of valves being configured to selectively circulate the refrigerant into each of the first heat exchanger, the second heat exchanger, the indoor heat exchanger and the inflator.

The air conditioner system may include a refrigerant line including the electrically driven compressor, the external heat exchanger, the inflator, the indoor heat exchanger, and the switching valve, and including a first valve provided between the first heat exchanger and the second heat exchanger.

The air conditioner system may include: a first path line diverging from a first portion between the electrically driven compressor and the indoor heat exchanger, and connected to a second portion between the second heat exchanger and the indoor heat exchanger, and including a second valve; a second path line diverging from the first valve and connected to a portion between the second valve and the indoor heat exchanger; and a third path line diverging from the first valve and connected to the refrigerant line by a third valve provided between the second valve and the indoor heat exchanger.

The inflator may include a first inflator and a second inflator, wherein the first inflator may be provided between the indoor heat exchanger and the third valve on the refrigerant line, and the second inflator may be provided on the third path line.

The air conditioner system may include: a controller, the controller configured for controlling the electrically driven compressor, the valve unit, and the inflator to generate cooling or heating conditioned air.

In indoor cooling, the controller may be configured to control the valve unit to circulate the refrigerant compressed in the electrically driven compressor into the first heat exchanger, the second heat exchanger, the first inflator, the indoor heat exchanger in order, so that cooling air may be supplied indoors while the indoor heat exchanger acts as an evaporator.

In indoor heating and heat pumping, the controller may be configured to control the valve unit to circulate the refrigerant compressed in the electrically driven compressor into the indoor heat exchanger, the first inflator, and the external heat exchanger in door, so that heating air may be supplied indoors and the temperature of the refrigerant may be adjusted while the indoor heat exchanger acts as a condenser.

The air conditioner system may include: an electric generating unit configured to generate electric power by regenerative breaking in deceleration of the mobility to charge a battery electrically connected to the electric generating unit and the electrically driven compressor, wherein when a battery charge amount of the battery is less than a preset capacity, the controller may allow the battery to be charged by the electric power generated by the regenerative breaking, and when the battery charge amount is equal to or greater than the preset capacity, the controller may check whether a conditioning device is operated or not.

When the air conditioner system is required to be operated in a state where the battery charge amount is equal to or greater than the preset capacity, the controller may be configured to control the valve unit and the inflator to supply cooling air or heating air indoors in response to a cooling or heating demand.

When the air conditioner system is operated in the state where the battery charge amount is equal to greater than the preset capacity, and then when non-operation of the air conditioner system is required in the state where the battery charge amount is less than the preset capacity, the controller may allow the battery to be charged by the electric power generated from the electric generating unit.

When non-operation of the air conditioner system is required in the state where the battery charge amount is equal to or greater than the preset capacity, the controller may allow the electrically driven compressor to be driven by the electric power generated from the electric generating unit to prevent the overcharging of the electric power.

When the overcharging of the electric power is prevented, the controller may be configured to control the valve unit so that the refrigerant compressed in the electrically driven compressor may be circulated into the first heat exchanger, the second inflator, and the second heat exchanger in order and the refrigerant may not be circulated into the indoor heat exchanger.

The air conditioner system for a mobility having the structure as described above is configured to secure air conditioning performance in air cooling and heating, and to prevent the battery from being deteriorated as the battery is prevented from being overcharged while the air conditioner system is driven when the battery is charged by regenerative breaking while charge amount of the battery is already high.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
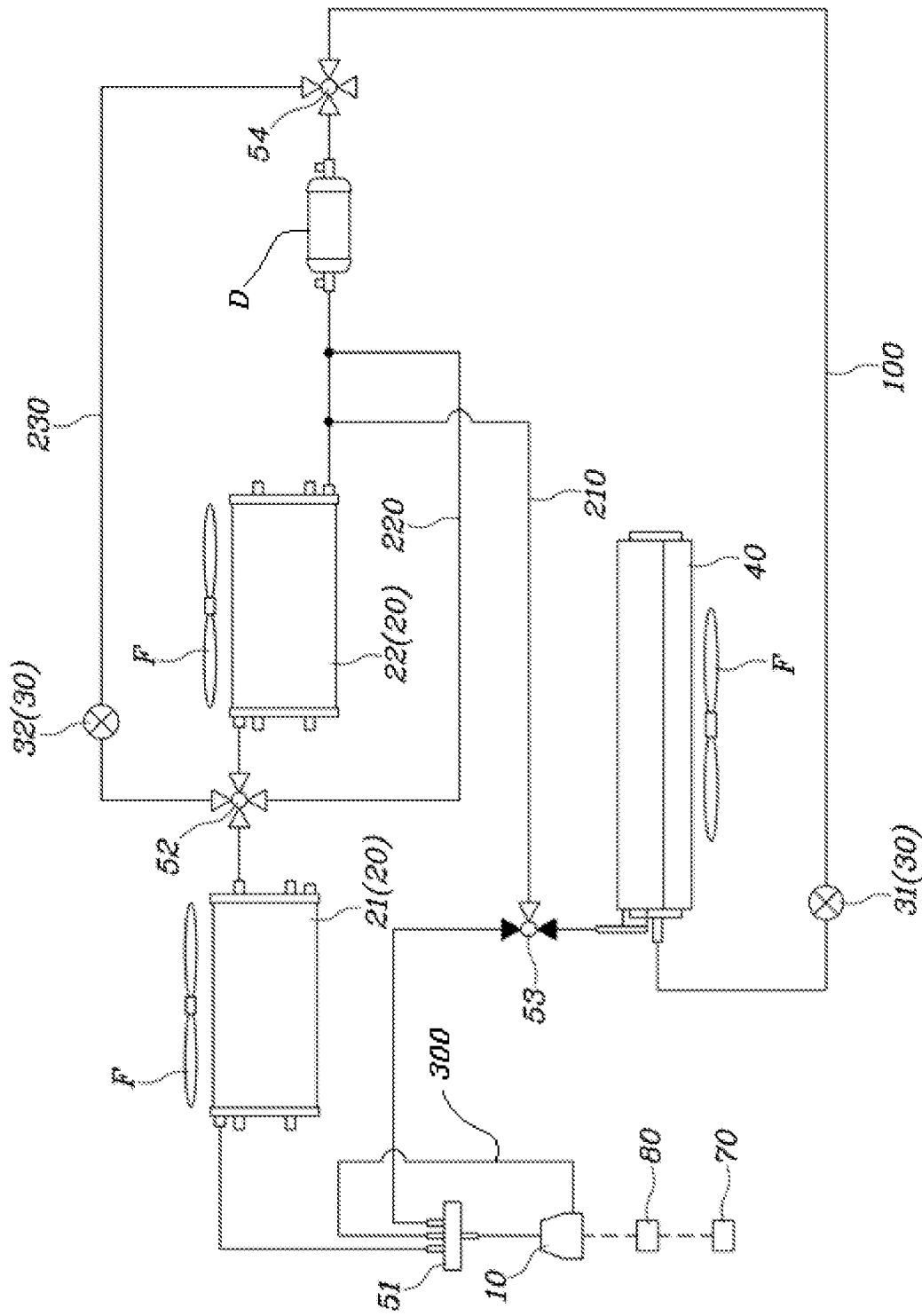
FIG. 1 is a view showing an air conditioner system for a mobility according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinbelow, an air conditioner system for a mobility according to various exemplary embodiments of the present disclosure will be described with reference to accompanying drawings.

Figure 2:
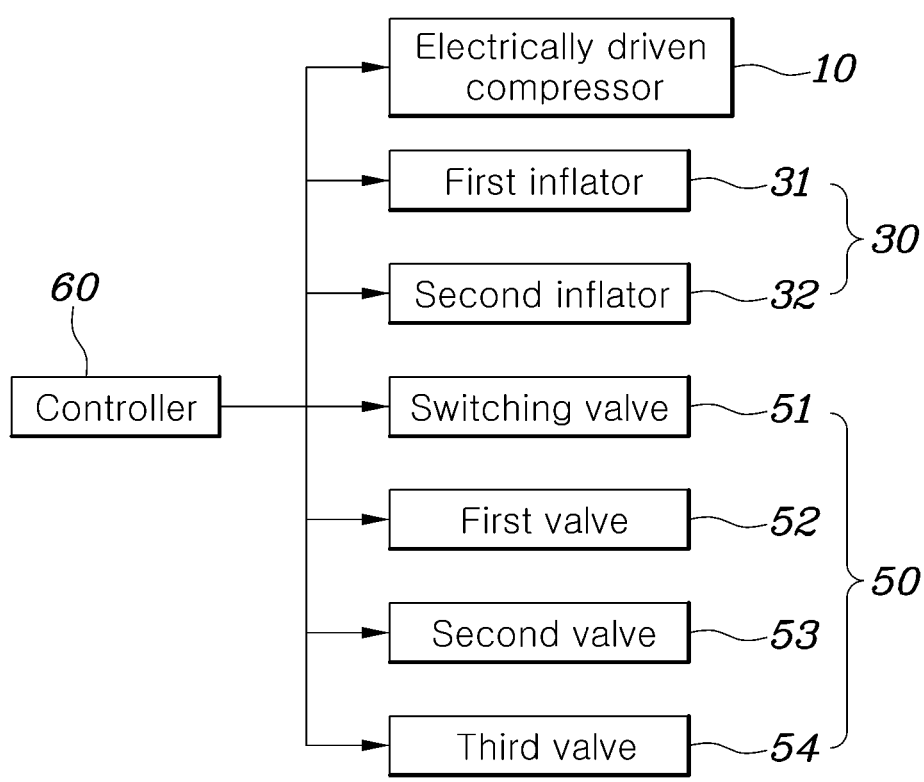
FIG. 2 is a block diagram showing the air conditioner system for a mobility shown in FIG. 1.
Figure 3:
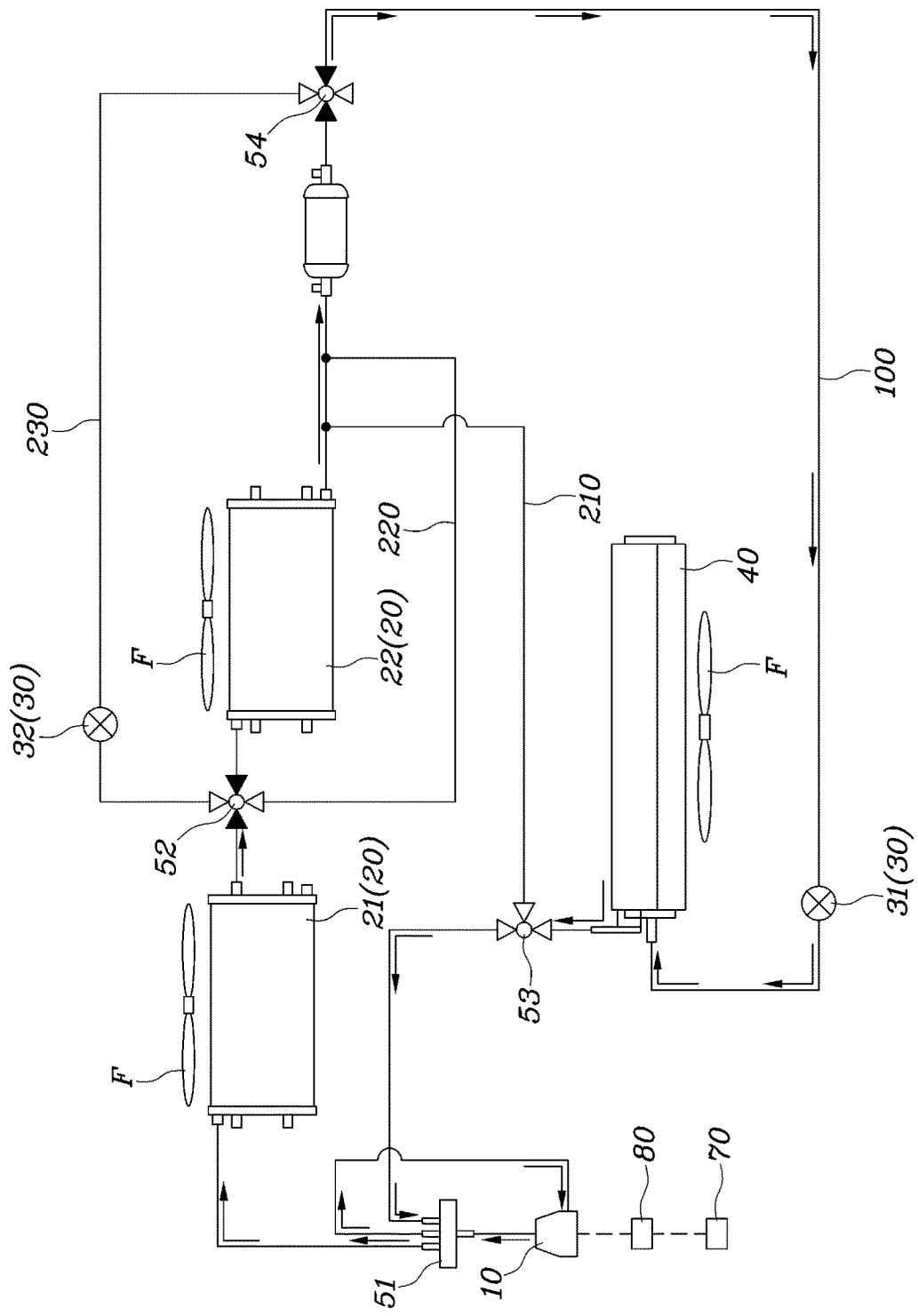
FIG. 3 is a view showing cooling operation of the air conditioner system for a mobility shown in FIG. 1.
Figure 4:
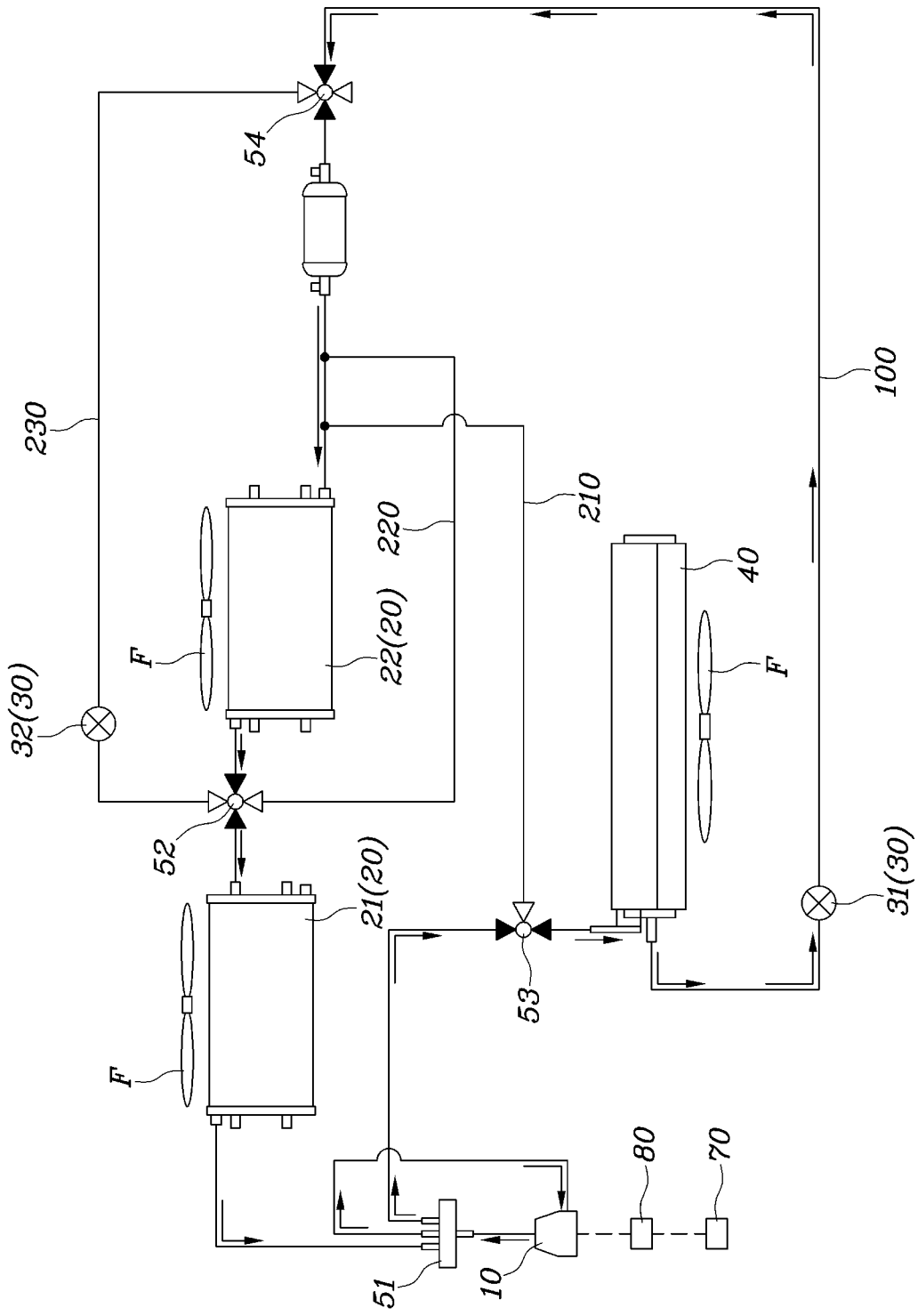
FIG. 4 is a view showing heating operation of the air conditioner system for a mobility shown in FIG. 1.
Figure 5:
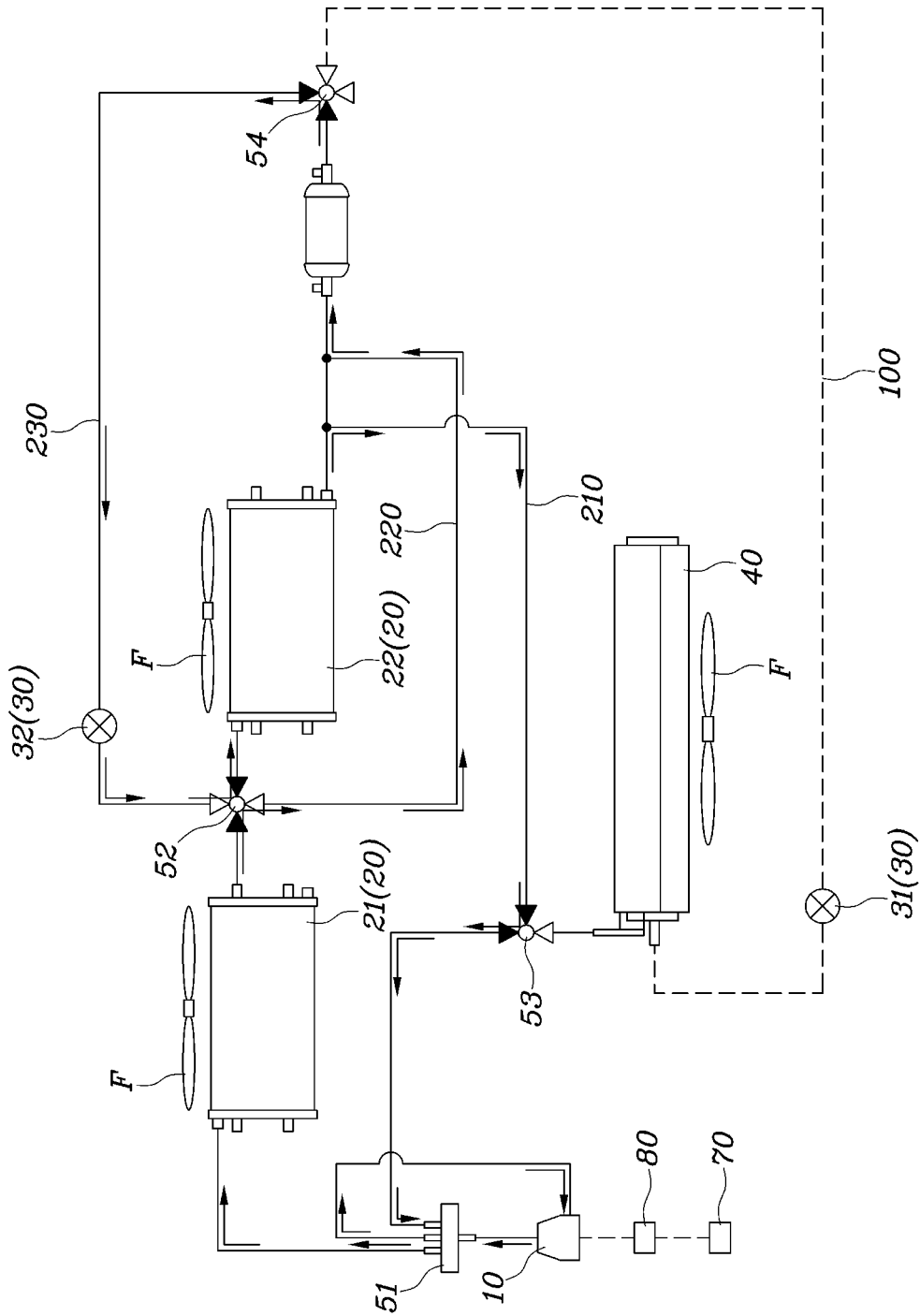
FIG. 5 is a view showing operation of preventing overcharging of electric power of the air conditioner system for a mobility shown in FIG. 1.

FIG. 1 is a view showing an air conditioner system for a mobility according to an exemplary embodiment of the present disclosure. FIG. 2 is a block diagram showing the air conditioner system for a mobility shown in FIG. 1. FIG. 3 is a view showing cooling operation of the air conditioner system for a mobility shown in FIG. 1. FIG. 4 is a view showing heating operation of the air conditioner system for a mobility shown in FIG. 1. FIG. 5 is a view showing operation of preventing overcharging of electric power of the air conditioner system for a mobility shown in FIG. 1.

According to an exemplary embodiment of the present disclosure, as shown in FIG. 1 and FIG. 2, the air conditioner system for a mobility includes: an electrically driven compressor 10 circulating a refrigerant; an external heat exchanger 20 includes a first heat exchanger 21 and a second heat exchanger 22 and performing heat exchange with outdoor air to adjust the temperature of the refrigerant; an inflator 30 inflating the refrigerant; an indoor heat exchanger 40 performing heat exchange to adjust temperature of air supplied into the indoor; and a valve unit 50 selectively switch a circulated direction of the refrigerant to selectively circulate the refrigerant into the external heat exchanger and the indoor heat exchanger depending on whether air cooling and heating is performed or not and power is overcharged or not.

In other words, the air conditioner system of the present disclosure may perform an air conditioning function as the refrigerant is circulated into the electrically driven compressor 10, the external heat exchanger 20, the inflator 30, and the indoor heat exchanger 40. Furthermore, a receiver drier D may be provided in the air conditioner system to store the refrigerant and remove moisture.

Herein, the electrically driven compressor 10 may be operated by being supplied with electric power from an electric power system provided in the mobility.

The external heat exchanger 20 includes the first heat exchanger 21 and the second heat exchanger 22. Therefore, when heat exchange is performed between air and the refrigerant in the external heat exchanger 20, heat exchange of the refrigerant is performed multiple times in the first heat exchanger 21 and the second heat exchanger 22 thereby improving the air conditioning performance. Furthermore, in prevention of overcharging of electric power to be described below, additional functions other than the air conditioning function may be performed as the first heat exchanger 21 and the second heat exchanger 22 alternately perform condensation and evaporation.

The inflator 30 is provided to inflate the refrigerant condensed while passing through the external heat exchanger 20 or the indoor heat exchanger 40.

The indoor heat exchanger 40 performs heat exchange with air supplied indoors and adjusts the temperature of the air so that cooling air or heating air is supplied indoors.

Therefore, each of the external heat exchanger 20 and the indoor heat exchanger 40 may include a fan F to efficiently circulate air.

Meanwhile, the valve unit 50 switches the circulated direction of the refrigerant which is circulated by the electrically driven compressor 10, so that the temperature of the air supplied indoors may be adjusted in response to the circulated direction of the refrigerant. The valve unit 50 includes a plurality of valves to switch the circulated direction of the refrigerant circulated into the external heat exchanger 20, the inflator 30, and the indoor heat exchanger 40 into various paths.

Therefore, in cooling and heating of the indoor, the valve unit 50 switches the circulated direction of the refrigerant so that the indoor heat exchanger 40 acts as an evaporator or a condenser and the temperature of conditioned air is adjusted.

In other words, in indoor cooling, the refrigerant compressed in the electrically driven compressor 10 is condensed while passing through the first heat exchanger 21 of the external heat exchanger 20 and is further condensed while passing through the second heat exchanger 22. After the refrigerant passes through the inflator 30, the refrigerant is evaporated in the indoor heat exchanger 40 so that cooling air is generated for cooling the indoor.

Furthermore, in heating of the indoor, the refrigerant compressed in the electrically driven compressor 10 is condensed in the indoor heat exchanger 40 and then passes through the inflator 30 or is circulated into the external heat exchanger 20. Therefore, heating air may be generated in the indoor heat exchanger 40 for heating the indoor. For heating the indoor, a separate PTC heater may be provided.

Furthermore, the external heat exchanger 20 and the indoor heat exchanger 40 may be configured to secure cooling and heating efficiency by a heat pump performing heat exchange with other cooling medium in a circulation process of the refrigerant.

Meanwhile, in preventing the overcharging of electric power, the air conditioner system of the present disclosure is configured to drive the electrically driven compressor 10 to consume electric power. The refrigerant circulated as the electrically driven compressor 10 is driven is prevented from being circulated into the indoor heat exchanger 40, so that the temperature of the indoor air is prevented from being forcibly adjusted. The first heat exchanger 21 and the second heat exchanger 22 forming the external heat exchanger 20 act as the evaporator and the condenser, respectively, so that the temperature-controlled air is discharged outdoors. Furthermore, as driving of the electrically driven compressor 10 is maintained, electric power consumption is induced and thus it is possible to prevent deterioration due to overcharging of a battery.

In describing the present disclosure in detail, the external heat exchanger 20 is provided external and performs heat exchange with outdoor air so that heat-exchanged air is discharged outdoors. The indoor heat exchanger 40 is provided at the indoor, and allow the heat exchanged air to be adjusted in the temperature and to be supplied indoors as conditioned air.

As described above, the external heat exchanger 20 is provided at the out door of a mobility and the indoor heat exchanger 40 is provided at the indoor space. Therefore, the external heat exchanger 20 performs heat exchange with outdoor air and the heat-exchanged air is discharged outdoors so that the indoor temperature is not affected. Furthermore, the indoor heat exchanger 40 performs heat exchange with air ventilated indoors and the heat-exchanged air is supplied indoors as the conditioned air, so that the indoor temperature is adjusted.

Meanwhile, the valve unit 50 includes a switching valve 51 and the plurality of valves. The switching valve 51 switches circulation of the refrigerant compressed in the electrically driven compressor 10 toward the indoor heat exchanger 40 or the external heat exchanger 20, and the plurality of valves allows the refrigerant to be selectively circulated into each of the first heat exchanger 21, the second heat exchanger 22, the indoor heat exchanger 40, and the inflator 30.

In other words, the valve unit 50 includes the plurality of valves including the switching valve 51 so that the circulated direction of the refrigerant may be variously switched. Herein, the plurality of valves including the switching valve 51 may adopt a three-way valve or a four-way valve in response to a path to switch the circulated direction of the refrigerant. Therefore, the refrigerant may have various circulated paths with respect to the electrically driven compressor 10, the first heat exchanger 21, the second heat exchanger 22, the indoor heat exchanger 40, and the inflator 30, so that functions for air cooling and heating and prevention of overcharging of electric power may be performed.

In detail, as shown in FIG. 1, the air conditioner system includes a refrigerant line 100. The refrigerant line 100 includes the electrically driven compressor 10, the external heat exchanger 20, the inflator 30, the indoor heat exchanger 40, and the switching valve 51, and the refrigerant line 100 includes a first valve 52 between the first heat exchanger 21 and the second heat exchanger 22.

The refrigerant line 100 is configured to circulate the refrigerant therein, and as the refrigerant compressed in the electrically driven compressor 10 is circulated into the external heat exchanger 20, the inflator 30, and the indoor heat exchanger 40, air with the temperature controlled in the indoor heat exchanger 40 is supplied indoors.

In other words, in indoor cooling, as the refrigerant is circulated into the electrically driven compressor 10, the external heat exchanger 20, the inflator 30, and the indoor heat exchanger 40 by the switching valve 51, air is cooled in the indoor heat exchanger 40. Furthermore, in indoor heating, as the refrigerant is circulated into the electrically driven compressor 10, the indoor heat exchanger 40, the inflator 30, and the external heat exchanger 20 by the switching valve 51, air is heated in the indoor heat exchanger 40.

Furthermore, as the external heat exchanger 20 includes the first heat exchanger 21 and the second heat exchanger 22, the external heat exchanger 20 performs a condensation process multiple times in the indoor cooling and performs an evaporation process multiple times in the indoor heating, improving air conditioning efficiency.

Meanwhile, the air conditioner system includes: a first path line 210 diverging from a portion between the electrically driven compressor 10 and the indoor heat exchanger 40 and connected to a portion between the second heat exchanger 22 and the indoor heat exchanger 40 and including a second valve 53; a second path line 220 diverging from the first valve 52 and connected to a portion between the second valve 53 and the indoor heat exchanger 40; and a third path line 230 diverging from the first valve 52 and connected to the refrigerant line 10 by a third valve 54 between the second valve 53 and the indoor heat exchanger 40.

The inflator 30 includes a first inflator 31 and a second inflator 32. The first inflator 31 is provided between the indoor heat exchanger 40 and the third valve 54 on the refrigerant line 100, and the second inflator 32 is provided on the third path line 230.

Furthermore, according to an exemplary embodiment of the present disclosure, the first path line 210, the second path line 220, and the third path line 230 diverge from the refrigerant line 100, so that the refrigerant may be circulated into the external heat exchanger 20, the inflator 30, and the indoor heat exchanger 40 in various paths. Accordingly, the lines have valves forming the valve unit 50, respectively.

In other words, the first path line 210 is provided to circulate the refrigerant compressed in the electrically driven compressor 10 into the second heat exchanger 22 forming the external heat exchanger 20 when the refrigerant is circulated into the indoor heat exchanger 40, and the first path line 210 is connected to the refrigerant line 100 by a medium of the second valve 53. In preventing overcharging of electric power, the first path line 210 is provided to prevent the indoor temperature from being adjusted due to circulation of the refrigerant into the indoor heat exchanger 40.

The second path line 220 diverges from the first valve 52 between the first heat exchanger 21 and the second heat exchanger 22 and is connected to a portion between the second valve 53 and the third valve 54. Therefore, the first heat exchanger 21 and the second heat exchanger 22 are not connected to each other in series and are connected to each other through the second inflator 32 to alternately perform condensation or evaporation.

The third path line 230 diverges from the first valve 52 between the first heat exchanger 21 and the second heat exchanger 22 and is connected to the second valve 53 and the third valve 54. The third path line 230 provides a different path than the second path line 220 and allows the first heat exchanger 21 and the second heat exchanger 22 to alternately perform condensation or evaporation together with the second path line 220. The third path line 230 is connected to the refrigerant line 100 by a medium of the third valve 54, so that circulation of the refrigerant into the indoor heat exchanger 40 is selectively allowed.

A circulated direction of the refrigerant on the refrigerant line 100 and the plurality of path lines is controlled by a controller 60. In other words, the controller 60 controls the electrically driven compressor 10, the valve unit 50, and the inflator 30 to generate cooling or heating conditioned air or to prevent the overcharging of the electric power.

In an exemplary of the present invention, a bypass path line 300 is connected to the switching valve 51 and the electrically driven compressor 10.

As shown in FIG. 3, in indoor cooling, the controller 60 controls the valve unit 50 so that the refrigerant compressed in the electrically driven compressor 10 is circulated into the first heat exchanger 21, the second heat exchanger 22, the first inflator 31, and the indoor heat exchanger 40 in order. Therefore, the indoor heat exchanger 40 acts as the evaporator and cooling air is supplied indoors.

In other words, in indoor cooling, the refrigerant compressed in the electrically driven compressor is circulated into the external heat exchanger 20 by the switching valve 51, and the first valve 52 is operated to allow circulation between the first heat exchanger 21 and the second heat exchanger 22, so that the refrigerant is condensed in the first heat exchanger 21 and then is condensed again in the second heat exchanger 22. Therefore, the refrigerant condensed in the external heat exchanger 20 is circulated into the first inflator 31 and the indoor heat exchanger 40 while passing through the second valve 53 and the third valve 54, cooling air generated by the evaporation process in the indoor heat exchanger 40 is circulated indoors. Therefore, the air conditioner system of the present disclosure may perform indoor cooling.

Meanwhile, as shown in FIG. 4, in indoor heating and heat pumping, the controller 60 controls the valve unit 50 to circulate the refrigerant compressed in the electrically driven compressor 10 into the indoor heat exchanger 40, the first inflator 31, and the external heat exchanger 20 in order. Accordingly, the indoor heat exchanger 40 acts as the condenser so that heating air is supplied indoors and the temperature of the refrigerant is adjusted.

In other words, in indoor heating, the refrigerant compressed in the electrically driven compressor is circulated into the indoor heat exchanger 40 by the switching valve 51 and is condensed. Herein, heating air generated through the condensation process in the indoor heat exchanger 40 is circulated indoors so that indoor heating may be performed. As described above, the refrigerant condensed in the indoor heat exchanger 40 is circulated into the first inflator 31 and the external heat exchanger 20. Furthermore, a number of evaporation processes of the refrigerant is performed in the second heat exchanger 22 and the first heat exchanger 21 forming the external heat exchanger 20, so that air conditioning efficiency is improved. Through the above process, the air conditioner system of the present disclosure may perform indoor heating.

Meanwhile, overcharging of electric power is prevented by the air conditioner system of the present disclosure.

The mobility includes an electric generating unit 70 to generate electric power by regenerative breaking in deceleration to charge the battery. The electric generating unit 70 may adopt various means charging electric power while driving of the mobility in addition to the regenerative breaking.

Herein, when the battery charge amount is less than a preset capacity, the controller 60 allows the battery 80 to be charged by electric power generated in the electric generating unit 70, so that the mobility is stably driven.

Meanwhile, when battery charge amount is equal to or greater than the preset capacity, the controller 60 checks whether the air conditioner system is operated or not. In other words, when charge amount of the battery 80 is equal to or greater than the preset capacity, power charge of the battery 80 is not required, so that the controller is configured to check whether the air conditioner system is driven or not to prevent the overcharging of the electric power.

When battery charge amount is equal to or greater than the preset capacity and there is a demand of operating the air conditioner, the controller 60 controls the valve unit 50 and the inflator 30 to supply cooling air or heating air indoors in response to a cooling or heating demand. Therefore, electric power generated in the electric generating unit 70 is consumed as the electrically driven compressor 10 is driven in response to operation of the air conditioner, so that overcharging of electric power of the battery 80 is prevented. Furthermore, cooling air or heating air may be normally provided in response to a required indoor temperature.

Meanwhile, when the air conditioner system is operated in a state where the charge amount of the battery 80 is equal to or greater than the preset capacity, and then non-operation of the air conditioner system is required in a state where the charge amount of the battery 80 is less than the preset capacity, the controller 60 allows the battery 80 to be charged by electric power generated by the regenerative breaking. In other words, when the charge amount of the battery 80 is less than the preset capacity due to driving of the mobility and driving of the air conditioner, charging of the battery 80 is required. In the above state, when non-operation of the air conditioner system is required, the controller 60 allows the battery 80 to be charged by electric power generated in the electric generating unit 70, so that normal driving of the mobility may be stably performed.

Meanwhile, non-operation of the air conditioner system is required in the state where the charge amount of the battery 80 is equal to or greater than the preset capacity, the controller 60 allows the electrically driven compressor 10 to be driven by electric power generated by the electric generating unit 70, so that overcharging of electric power is prevented. In other words, when the charge amount of the battery 80 is equal to or greater than the preset capacity, the controller forcibly drives the electrically driven compressor 10, so that overcharging of the battery 80 is prevented by electric power consumption caused by the electrically driven compressor 10.

Therefore, the controller 60 controls the valve unit 50 in prevention of overcharging of electric power, so that the refrigerant compressed in the electrically driven compressor 10 is circulated into the first heat exchanger 21, the second inflator 32, and the second heat exchanger 22 in order, and is not circulated into the indoor heat exchanger 40.

As shown in FIG. 5, in prevention of overcharging of electric power, the refrigerant compressed in the electrically driven compressor is condensed by being circulated into the first heat exchanger 21 of the external heat exchanger 20 by the switching valve 51. The refrigerant condensed in the first heat exchanger 21 bypasses the second heat exchanger 22 by passing through the second path line 220 by the first valve 52. As described above, the refrigerant circulated through the second path line 220 is circulated into the third path line 230 by the third valve 54 and is inflated by the second inflator 32. The inflated refrigerant is evaporated by the second heat exchanger 22. As described above, the first heat exchanger 21 performs condensing operation and the second heat exchanger 22 performs evaporating operation, so that cooling cycle is formed by circulation of the refrigerant due to driving of the electrically driven compressor 10 and electric power is consumed. Furthermore, the air with temperature adjusted in the first heat exchanger 21 and the second heat exchanger 22 is discharged outdoors, so that the indoor temperature is not affected.

Meanwhile, the refrigerant passing through the second heat exchanger 22 is re-circulated into the electrically driven compressor 10 through the first path line 210. In the first path line 210, the second valve 53 prevents the refrigerant from being circulated into the indoor heat exchanger 40, so that the indoor temperature is prevented from being changed by the indoor heat exchanger 40.

Therefore, according to an exemplary embodiment of the present disclosure, overcharging of electric power is prevented by the air conditioner system and the indoor temperature is not changed thus securing indoor comfortability.

The air conditioner system for a mobility having the structure as described above is configured to secure air conditioning performance in air cooling and heating, and to prevent deterioration of the battery by preventing overcharging of the battery as the air conditioner system is driven when the battery is charged by the regenerative breaking while the charge amount of the battery is already high.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by multiple control devices, or an integrated single control device.

In various exemplary embodiments of the present disclosure, the control device may be implemented in a form of hardware or software, or may be implemented in a combination of hardware and software.

Furthermore, the terms such as "unit", "module", etc. Included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An air conditioner system for a mobility, the air conditioner system comprising:
   an electrically driven compressor configured to circulate a refrigerant;
   an external heat exchanger unit including a first heat exchanger and a second heat exchanger and configured to perform heat exchange with outdoor air to adjust temperature of the refrigerant;
   an inflator unit configured to inflate the refrigerant;
   an indoor heat exchanger configured to adjust temperature of air supplied indoors through heat exchange;
   a valve unit configured to selectively switch a circulated direction of the refrigerant to selectively circulate the refrigerant into the external heat exchanger unit and the indoor heat exchanger depending on whether air cooling and heating is performed or not and overcharging of electric power occurs or not;
   a refrigerant line including the electrically driven compressor, the external heat exchanger unit, the inflator unit, the indoor heat exchanger, and a switching valve, and a first valve provided between the first heat exchanger and the second heat exchanger;
   a first path line diverging from a first portion between the electrically driven compressor and the indoor heat exchanger, and connected to a second portion between the second heat exchanger and the indoor heat exchanger, and including a second valve;
   a second path line diverging from the first valve and connected to a portion between the second valve and the indoor heat exchanger; and
   a third path line diverging from the first valve and connected to a refrigerant line by a third valve provided between the second valve and the indoor heat exchanger,
   wherein a plurality of valves include the second valve and the third valve.

2. The air conditioner system of claim 1, wherein the external heat exchanger unit is provided at an outdoor space and configured to perform heat exchange with the outdoor air and to discharge heat-exchanged air outdoors, and
   wherein the indoor heat exchanger is provided at an indoor space and configured to adjust a temperature of the heat-exchanged air and supply the heat-exchanged air to the indoor as conditioned air.

3. The air conditioner system of claim 1, wherein the valve unit includes:
   the switching valve connected to the first heat exchanger and the indoor heat exchanger; and
   the plurality of valves,
   wherein the switching valve is configured to switch circulation of the refrigerant compressed in the electrically driven compressor into the indoor heat exchanger or the external heat exchanger unit, and
   wherein the plurality of valves is configured to selectively circulate the refrigerant into each of the first heat exchanger, the second heat exchanger, the indoor heat exchanger and the inflator unit.

4. The air conditioner system of claim 3, wherein the plurality of valves further include the first valve.

5. The air conditioner system of claim 1,
   wherein the second valve is connected to the switching valve, the first path line and the indoor heat exchanger.

6. The air conditioner system of claim 1,
   wherein the third valve is connected to the second heat exchanger, the third path line and the indoor heat exchanger.

7. The air conditioner system of claim 1,
   wherein the inflator unit includes a first inflator and a second inflator, and
   wherein the first inflator is provided between the indoor heat exchanger and the third valve on the refrigerant line, and the second inflator is provided on the third path line.

8. The air conditioner system of claim 7, further including:
   a controller configured for controlling the electrically driven compressor, the valve unit, and the inflator unit to generate cooling or heating conditioned air.

9. The air conditioner system of claim 8, wherein in indoor cooling, the controller is configured to control the valve unit to circulate the refrigerant compressed in the electrically driven compressor into the first heat exchanger, the second heat exchanger, the first inflator, the indoor heat exchanger in order, so that cooling air is supplied indoors while the indoor heat exchanger acts as an evaporator.

10. The air conditioner system of claim 8, when in indoor heating and heat pumping, the controller is configured to control the valve unit to circulate the refrigerant compressed in the electrically driven compressor into the indoor heat exchanger, the first inflator, and the external heat exchanger unit in order, so that heating air is supplied indoors and the temperature of the refrigerant is adjusted while the indoor heat exchanger acts as a condenser.

11. The air conditioner system of claim 8, further including:
an electric generating unit configured to generate electric power by regenerative breaking in deceleration of the mobility to charge a battery electrically connected to the electric generating unit and the electrically driven compressor,
wherein when a battery charge amount of the battery is less than a preset capacity, the controller is configured to allow the battery to be charged by the electric power generated by the regenerative breaking, and when the battery charge amount is equal to or greater than the preset capacity, the controller is configured to check whether the air conditioner system is operated or not.

12. The air conditioner system of claim 11, wherein when the air conditioner system is required to be operated in a state where the battery charge amount is equal to or greater than the preset capacity, the controller is configured to control the valve unit and the inflator unit to supply cooling air or heating air indoors in response to a cooling or heating demand.

13. The air conditioner system of claim 12, wherein when the air conditioner system is operated in the state where the battery charge amount is equal to greater than the preset capacity, and then when non-operation of the air conditioner system is required in a state where the battery charge amount is less than the preset capacity, the controller is configured to allow the battery to be charged by the electric power generated from the electric generating unit.

14. The air conditioner system of claim 11, wherein when non-operation of the air conditioner system is required in a state where the battery charge amount is equal to or greater than the preset capacity, the controller is configured to allow the electrically driven compressor to be driven by the electric power generated from the electric generating unit to prevent the overcharging of the electric power.

15. The air conditioner system of claim 14, wherein when the overcharging of the electric power is prevented, the controller is configured to control the valve unit so that the refrigerant compressed in the electrically driven compressor is circulated into the first heat exchanger, the second inflator, and the second heat exchanger in order and the refrigerant is not circulated into the indoor heat exchanger.

16. The air conditioner system of claim 1, further including:
a bypass path line connected to the switching valve and the electrically driven compressor.

17. A method of controlling the air conditioner system of claim 7, the method comprising:
in indoor cooling, controlling, by a controller, the valve unit to circulate the refrigerant compressed in the electrically driven compressor into the first heat exchanger, the second heat exchanger, the first inflator, the indoor heat exchanger in order, so that cooling air is supplied indoors while the indoor heat exchanger acts as an evaporator, and
in indoor heating and heat pumping, controlling, by the controller, the valve unit to circulate the refrigerant compressed in the electrically driven compressor into the indoor heat exchanger, the first inflator, and the external heat exchanger unit in door, so that heating air is supplied indoors and the temperature of the refrigerant is adjusted while the indoor heat exchanger acts as a condenser.

18. The method of claim 17, further including:
when a battery charge amount of a battery electrically connected to the electrically driven compressor is less than a preset capacity, allowing, by the controller, the battery to be charged by the electric power generated by the regenerative breaking in deceleration of the mobility by an electric generating unit connected to the battery,
wherein when the air conditioner system is required to be operated in a state where the battery charge amount is equal to or greater than the preset capacity, the controller is configured to control the valve unit and the inflator unit to supply cooling air or heating air indoors in response to a cooling or heating demand, and
wherein when the air conditioner system is operated in the state where the battery charge amount is equal to greater than the preset capacity, and when non-operation of the air conditioner system is required in the state where the battery charge amount is less than the preset capacity, the controller is configured to allow the battery to be charged by the electric power generated from the electric generating unit.

19. The method of claim 18,
wherein when non-operation of the air conditioner system is required in the state where the battery charge amount is equal to or greater than the preset capacity, the controller is configured to allow the electrically driven compressor to be driven by the electric power generated from the electric generating unit to prevent the overcharging of the electric power, and
wherein when the overcharging of the electric power is prevented, the controller is configured to control the valve unit so that the refrigerant compressed in the electrically driven compressor is circulated into the first heat exchanger, the second inflator, and the second heat exchanger in order and the refrigerant is not circulated into the indoor heat exchanger.

* * * * *